United States Patent
Shi

(10) Patent No.: US 8,794,229 B2
(45) Date of Patent: Aug. 5, 2014

(54) SOLAR CONCENTRATOR

(76) Inventor: Feng Shi, Klamath Falls, OR (US)

(*) Notice: Subject to any disclaimer, the term of this patent is extended or adjusted under 35 U.S.C. 154(b) by 0 days.

(21) Appl. No.: 13/134,715

(22) Filed: Jun. 15, 2011

(65) Prior Publication Data

US 2013/0033775 A1  Feb. 7, 2013

(51) Int. Cl.
*F24J 2/08* (2006.01)
*F24J 2/10* (2006.01)
*G02B 5/10* (2006.01)
*F24J 2/12* (2006.01)

(52) U.S. Cl.
CPC . *G02B 5/10* (2013.01); *Y02E 10/42* (2013.01); *F24J 2002/1071* (2013.01); *F24J 2/12* (2013.01); *F24J 2002/1019* (2013.01)
USPC .......................................... 126/684

(58) Field of Classification Search
CPC ............... F24J 2/10; F24J 2/12; F24J 2/18; F24J 2/06; F24J 2/05; F24J 2/04; F24J 2/0007; F24J 2/0015; G02B 7/182; G02B 7/183
USPC .......... 126/569–713; 359/853, 857–859, 838, 359/839, 850–851, 867, 871, 884; 136/246–248, 259; 52/173.3; 343/721, 343/915
See application file for complete search history.

(56) References Cited

U.S. PATENT DOCUMENTS

| | | | |
|---|---|---|---|
| 2,977,596 A | 3/1961 | Justice | |
| 3,452,355 A | 6/1969 | Slater et al. | |
| 4,038,972 A * | 8/1977 | Orrison | 126/578 |
| 4,048,983 A | 9/1977 | Pei | |
| 4,328,792 A | 5/1982 | Shores | |
| 4,364,053 A | 12/1982 | Hotine | |
| 4,421,104 A | 12/1983 | Adcock | |
| 4,543,945 A | 10/1985 | Hattan | |
| 4,672,389 A | 6/1987 | Ulry | |
| 4,755,819 A | 7/1988 | Bernasconi et al. | |
| 4,804,972 A | 2/1989 | Shudel | |
| 5,893,360 A | 4/1999 | Stoumen et al. | |
| 6,047,697 A | 4/2000 | Best | |
| 6,668,820 B2 * | 12/2003 | Cohen et al. | 126/685 |
| 6,897,832 B2 | 5/2005 | Essig, Jr. et al. | |
| 7,061,692 B2 | 6/2006 | Sahara et al. | |
| 2007/0256726 A1 * | 11/2007 | Fork et al. | 136/246 |

FOREIGN PATENT DOCUMENTS

| | | |
|---|---|---|
| DE | 3921086 A1 | 1/1991 |
| DE | 4009754 A1 | 1/1991 |
| GB | 2104644 A | 3/1983 |

* cited by examiner

*Primary Examiner* — Jennifer L Doak
*Assistant Examiner* — Kimberly N Kakalec
(74) *Attorney, Agent, or Firm* — Schwabe Williamson & Wyatt

(57) ABSTRACT

A solar concentrator which is a closed chamber with transparent wall, which is formed into a bulb structure; the bulb structure forms a sealed cavity where vacuum can be formed and the gases with certain compositions can be filled in; the bottom portion of the chamber wall is shaped into a parabola; the bottom portion of the said parabola wall is shaped into a CPC; the center part of the top portion of the chamber is shaped into a concave parabola, and the curvature of the said concave parabola is opposite to the said bottom parabola; a reflective layer is coated on the inner surface or outer surface of the said bottom parabola and the said CPC; a reflective layer is coated on the inner surface or outer surface of the said top concave parabola, wherein the incident light, which penetrates through the top transparent wall, will be reflected and concentrated by the bottom parabola to the top parabola, then reflected by the top parabola to form collimated beam light, and the beam light is collected with the assistance of the said CPC.

7 Claims, 5 Drawing Sheets

SOLAR CONCENTRATOR

TECHNICAL FIELD

The present disclosure relates generally to solar concentrators. More specifically, to close structure reflective solar concentrators with secondary reflector.

BACKGROUND

Solar radiation is a diffuse energy resource. Average solar radiation intensity on earth is around 800 W/m$^2$, varying with location, weather and season. Normally, an apparatus for a solar energy application needs a large area to collect solar radiation. Therefore, to make solar power the main stream energy supply, a breakthrough has to be made in creating an extremely low cost solar collector.

A solar concentrator is widely used for condensing solar radiation and is proved as a promising means for realizing extremely low cost solar collection. Generally there are two types of solar concentrator: one is a Fresnel Lens (FS) based on refraction of light, and the other is a parabolic reflector based on reflection of light. Due to the decisive factor of cost, in most of the large scale solar energy application systems, reflective solar concentrators are adopted to collect and condense solar radiation.

Most reflective solar concentrators are designed into a concave reflector structure which is generally in either a parabola form or a parabolic trough form. Most, and probably near all, of these reflectors have been built of relatively rigid materials such as metals. Usually, rigid reflective components are molded and assembled into a predetermined geometric shape and retained by suitable fastening means. Since this type of apparatus is an open system, to protect against wind and load, the rigid reflective components and fastening parts must be made of materials with certain stiffness, thickness and mass. Conventional solar concentrators for large scale solar systems appear bulky, heavy and expensive. The manufacturing processes for forming precision geometric shapes for rigid parts are proved complicated, slow and expensive. In addition, in the open systems, the reflective surface of the reflector structure is directly exposed to the outdoor condition and lacks protection from dust and other contaminations.

Most solar concentrators are effective only with directly incident solar radiation, so most solar concentrators are driven by a power system and a control system to track the sun and maintain direct solar incidence. When the solar concentrator is heavy, it adds significant loads to the tracking system and makes it complicated and expensive.

Several types of solar concentrators using non-rigid, light-weight and cheap materials were proposed to reduce the weight and to lower the cost. Among them, the most typical is the inflatable reflector structure. This structure employs an inflatable balloon which, when inflated, provides the structural frame to hold the concentrator portion of the apparatus in the parabola or parabolic trough shape in the desired position. In some of this type of structure, the reflector surface which forms the concentrator consists of a metallic coating on the inner surface of the balloon and in some other structures the concentrator portion is formed by a diaphragm type structure which is located within the balloon and has its perimeter attached to the inside surface of the balloon so that when the balloon is inflated the diaphragm is pulled into its desired operating shape.

U.S. Pat. No. 2,977,596 to Justice et al. disclosed such a structure using a diaphragm means to form an operating shape. In this disclosure, an air source is employed to maintain the inner pressure of the balloon. U.S. Pat. No. 4,672,389 to Ulry disclosed an inflatable reflector structure in which the concave reflector surface is constructed of a non-rigid flexible material, which is maintained in position and form by means other than the strength of the material itself. Ulry employs an inflation means in communication with the interior of an envelope, which is essentially a balloon, to provide and maintain fluid at super ambient pressure within the interior of the envelope. In GB 2 104 644, Leroy disclosed an inflatable solar collector structure with an element shaped into a parabolic trough reflector and maintained by inflation means. The inflation means is used to generate an internal pressure of the element that is greater than atmosphere. In U.S. Pat. No. 4,328,792, Shores disclosed a solar heat collector with an element which is a closed structure. However this element is composed of two parts: a parabolic trough reflector and a transparent cover. These parts are conventional components made of rigid materials such as metals.

There are certain difficulties connected with these inflatable structures. One of the more obvious ones is the tendency of the balloon to become distorted due to wind and other factors. This distortion, of course, results in some distortion of the reflecting surface of the concentrator which is an undesirable characteristic. The inflatable structure erected by an internal pressure above the external pressure of the structure needs a support system to stand up, and therefore extra fastening means such as rims are necessary. An inflation means in communication with the interior of the structure must be provided to maintain the internal fluid at super ambient pressure within the interior of the structure. Almost all of inflatable systems are used for short term and temporary purposes. Inflatable systems are mainly used in remote areas as a portable and collapsible apparatus.

For large scale and permanent solar applications, solar collectors made of light-weight and low cost materials with a simple structure, a strong resistance to outdoor conditions, and the capability of being easily manufactured are long expected. Obviously, inflatable systems are not the candidates that can fulfill the mission.

My own pending patent Ser. No. 11/983,971 describes a reflector structure through which moldable, light-weight and low-cost materials, including glass, are used to manufacture a solar concentrator without loss of the quality and performance of conventional solar concentrators made of high quality rigid materials such as metals. This disclosure provides a non-inflatable reflector structure to eliminate the extra fastening means and inflation means of the inflatable structures so as to simplify the concentrator system, but still retain the integrity and performance that is usually associated with flexible inflated structures. This non-inflatable reflector structure avoids the distortion of the reflector surface caused by wind and other factors when in use, and guarantees the accuracy of the geometric shape of the reflector surface formed in the manufacture process. This disclosure provides an enclosed, non-inflatable reflector structure that is a single body of thin walled material that is constructed without any other elements so that it can be easily manufactured and utilized. This disclosure provides a non-inflatable reflector structure that is a closed structure, but which has an opening to connect the interior of the structure to the atmosphere so that the pressure within the interior of the structure is equal to the atmospheric pressure. Consequently the reflector structure is formed by the material strength itself rather than the internal pressure of the structure being above atmospheric pressure.

Although, the non-inflatable reflector structure disclosed in my pending patent Ser. No. 11/983,971 effectively overcomes the disadvantages of close structure reflective concentrators, it still suffers from three drawbacks. (1) Separate front receiver; the concentrator systems need receivers positioned on the focal points of the concentrators to convert the concentrated sunlight into electricity or heat. In most of the conventional configurations of the concentration systems including my pending patent Ser. No. 11/983,971, the receivers are separated from the concentrators and mounted in front of the concentrators. This receiver and concentrator assembly makes it very difficult to design and install the receiver, as well as connect the receivers to the rest entire system. (2) Receiver support arms and shadowing; separated receivers need extra support arms to be mounted on the focal points. While, the extra support arms not only consume extra materials and make system complicated, but also cast shadow on the concentrator dishes. (3) Separated auxiliary optics for receivers; in most concentrator systems, an auxiliary optics are added to the receivers to accommodate the misalignment of the concentrated sunlight due to the limited precision of tracking systems. Normally, the auxiliary optics such as a lens or a CPC (Compound Parabolic Concentrator) separates from the concentrator. This configuration needs extra component and makes the system complicated.

The objective of the present invention is to provide a close reflector structure, which modifies the structure disclosed in my pending patent Ser. No. 11/983,971, but still retains all the advantages of the structure, to (1) move the receiver of the concentrator system to the back of the concentrator; (2) eliminate the support arms of the receivers to simplify the structure and save materials; (3) integrate the auxiliary optics into concentrator to further simplify the system structure. This disclosure is to incorporate a secondary concentrator and the auxiliary optics for receiver into the first concentrator to make the receiver and concentrator assembly one entity.

U.S. Pre Grant Publication N. 2007/0256726 to David K. Fork et al disclosed a laminated solar concentrating photovoltaic device. In Fork system, although a transparent cover and a convex second reflective surface are introduced, their transparent cover is a flat plate which is not shaped to form a parabola such that the second reflector is formed by coating a reflective layer on the parabola. Moreover, in Fork system, the second reflective surface is a convex surface which converges the light concentrated by the first reflector so that the incident light is continuously concentrated to the receiver. In the optics of Fork system, the concentration ratio and other optical parameters are controlled by the distance between the receiver and the second reflective surface.

U.S. Pat. No. 6,668,820 to Gilbert E. Cohen et al discloses a solar concentrator which includes a second reflective surface, in addition to the same concentrating optics as that of Fork system, it is an open system without transparent cover.

The present invention creates a concentrator which is a sealed transparent chamber that forms a closed structure named as "bulb" structure, where a cavity is formed by the chamber for vacuum and for filling in gases with certain compositions. The portions of the transparent body wall of the chamber are shaped into parabolas which serve as substrates for reflective layers coated on them to form the first reflector and the second reflector. The first reflector and the second reflector are configured in such a way that the focal point of the first reflector is overlapped with that of the second reflector to form a new optics in which the incident light concentrated by the first reflector is reflected by the second reflector to form a concentrated and collimated beam light. In the new optics, the concentration ratio and other optical parameters are controlled by the relative positions and features of the first reflector and the second reflector. The new optics does not involve the relative position of receiver. Overall, the present invention provides a concentrator with all its reflectors shaped on its body wall; and the entity of the concentrator body contains vacuum or gases with certain compositions.

SUMMARY

In summary, an enclosed, hollow core structure enables moldable, light-weight and cheap materials, including glass, to be used to construct a strong mechanical structure to protect against wind and other factors. In particular, with integrated optical design the structure enables the elimination of the support arms and the separated auxiliary optics of the receiver assembly. In addition, the closed structure named as "bulb" structure is a transparent chamber which is sealed to form a cavity which contains vacuum and gases with certain compositions. The first concave concentrator and the second concave concentrator formed by shaping the portions of the transparent body walls of the chamber are configured in such a way that the focal point of the first concentrator is overlapped with the focal point of the second concentrator so that the output light after the entire concentrator is a collimated beam light.

In one embodiment, a solar concentrator comprises an upper transparent surface and a lower transparent surface. A reflective layer is on the lower transparent surface. The lower transparent surface is shaped such that the reflective layer reflects and concentrates incident light. In particular, the lower transparent surface is shaped to form an additional CPC (Compound Parabolic Concentrator) as auxiliary optics of the receiver. The upper transparent surface is shaped in such a way that a small fraction of the surface forms a secondary mirror to re-concentrate the concentrated light by the lower surface so that the concentrated light is turned to the receiver installed on the back of the lower surface.

In another embodiment, the whole chamber is molded to form a closed "bulb" structure in such a way that the first and second parabolas are formed on the body wall of the chamber, and then two reflective layers are coated on inner or outer surfaces of the parabolas to form concentrators. Finally the bulb structure is sealed for vacuum and filled in gases with certain compositions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
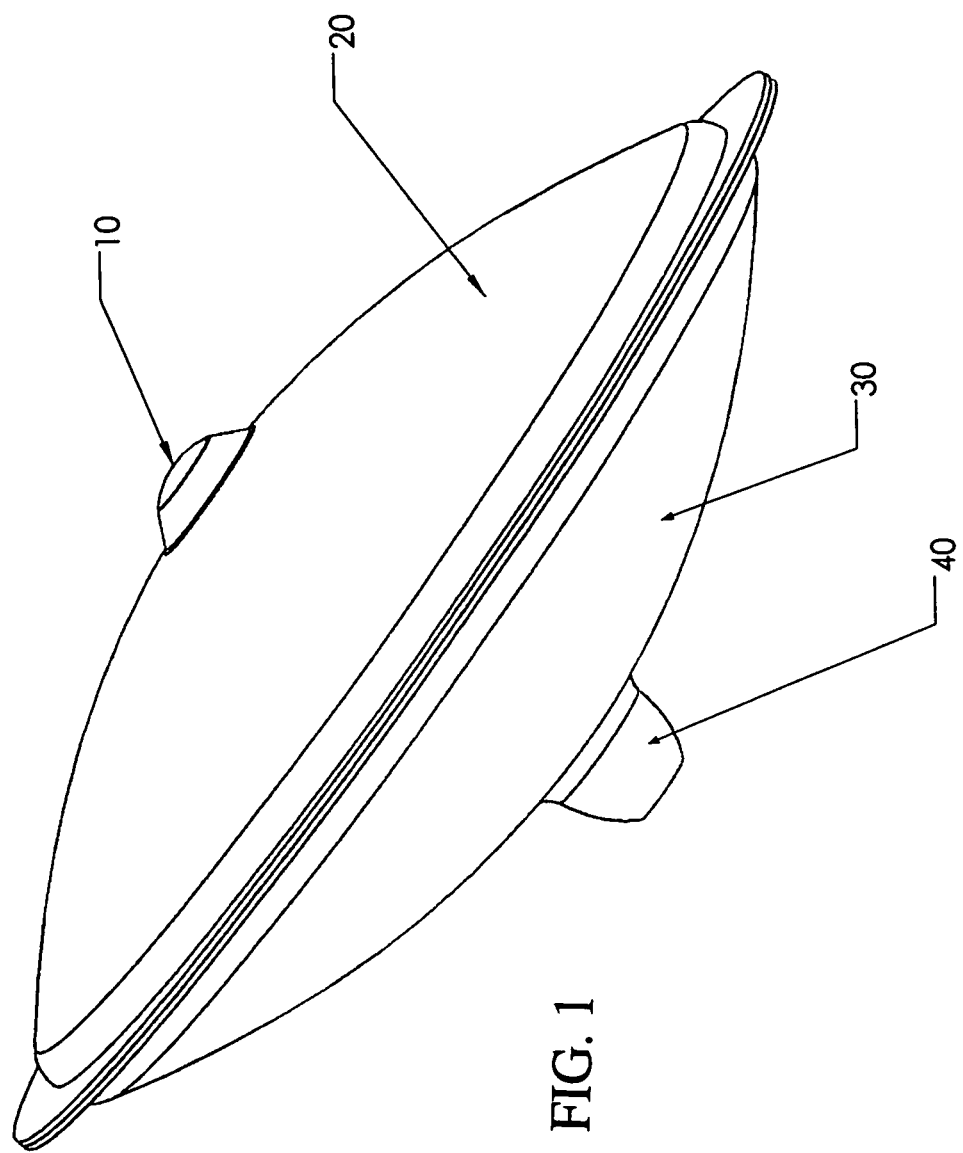
FIG. 1 is the assembly of an example of the concentrator structure.

Referring to FIG. 1, the solar concentrator body is an assembly of the components made of moldable, lightweight and cheap material, such as glass or plastic. In this embodiment, the assembly is consists of an upper part of transparent cover and a lower part of concave parabola dish. The upper part and the lower part are sealed together to form an empty core entity which is a strong mechanical structure through the rims of each of the parts. The lower part of concave parabola dish is coated with a metallic reflective layer on its inner surface. The incident sunlight will penetrate through the upper transparent cover and reach to the reflective surface on the lower part concave dish, where the sunlight is reflected and concentrated to the focal point of the parabola dish.

Figure 2:
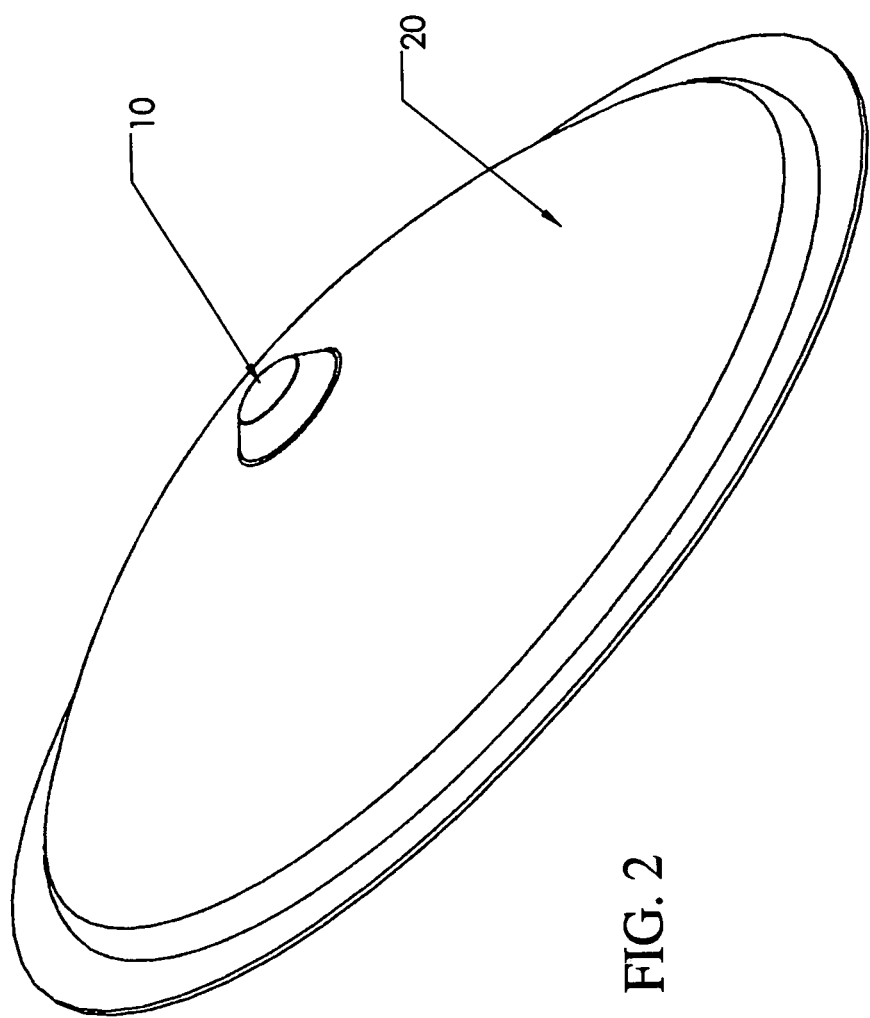
FIG. 2 is a component of the concentrator structure of FIG. 1.

Referring to FIG. 2, the upper part of the transparent cover is shaped to form a dome with an inverse parabola 10 at its top area at the center of the transparent cover 20. The inner surface of the parabola is coated with metallic reflective layer. The focal point of the inverse parabola 10 is coincident to the focal point of the lower part concave parabola dish 30.

Figure 3:
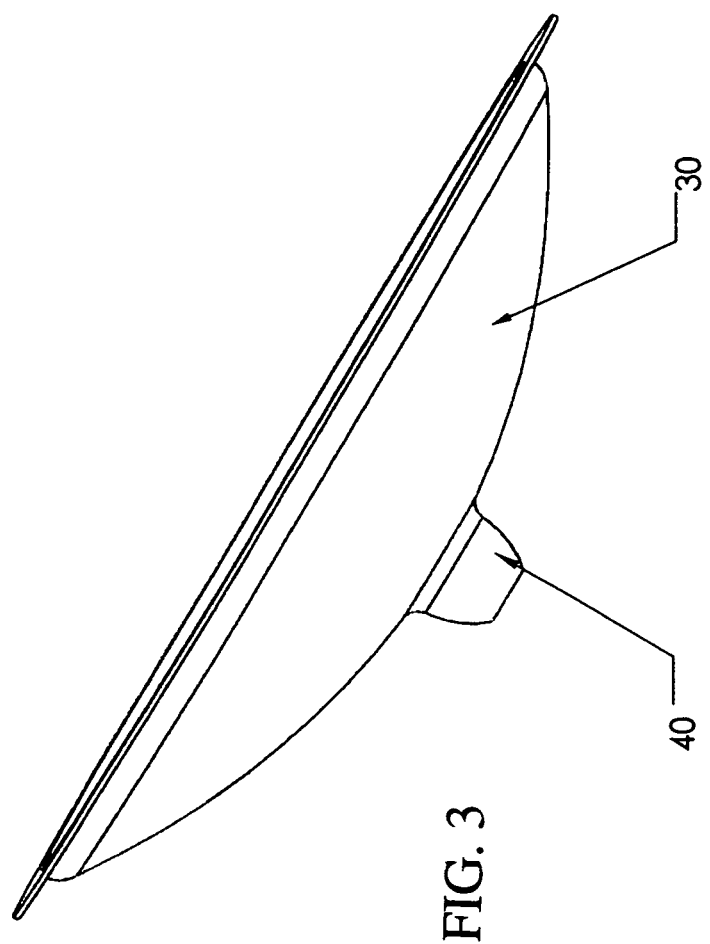
FIG. 3 is the other component of the concentrator structure of FIG. 1.

Referring to FIG. 3, the lower part concave parabola dish 30 is shaped to form a CPC concentrator 40 which serves as auxiliary optics of receiver. The inner surface of the CPC concentrator is coated with a metallic reflective layer.

The work principle of the concentrator structure is elucidated as the following. As the incident sunlight penetrates through the upper transparent cover 20 and reaches the reflective surface of the lower concave parabola reflector 30, it is reflected and concentrated to the focal point of the lower parabola reflector by the reflective layer. The concentrated sunlight will not stop at the focal point, but keep on going to reach the second mirror 10 integrated at the center of the upper transparent cover 20. Since the second mirror 10 which is an inverse parabola sharing the same focal point with the lower parabola 30, the concentrated sunlight will be reflected back forming a light beam to the center of the lower parabola. At the center of the lower parabola, a CPC 40 is integrated in the parabola 40 and the receiver which could be a photovoltaic cell, heat exchanger or other energy conversion device is positioned at the bottom of the CPC 40. The CPC then couples the light beam to the receiver.

Figure 4:
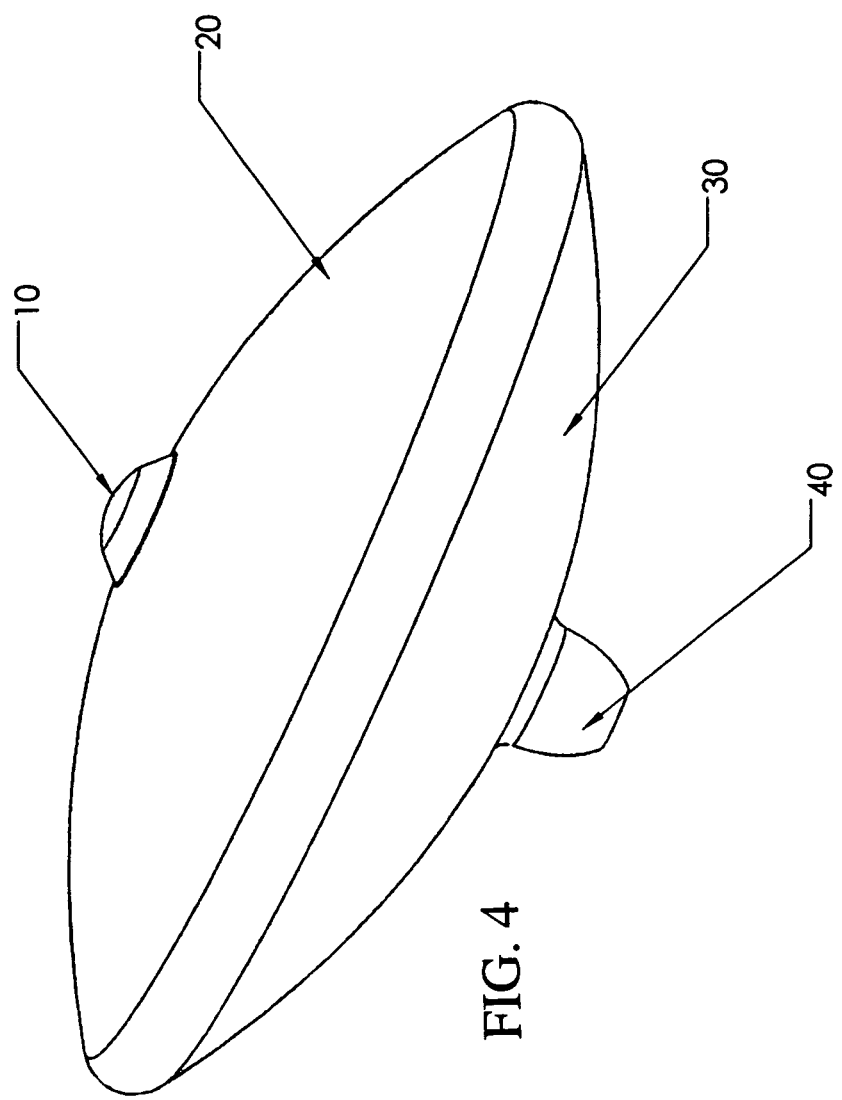
FIG. 4 is an alternative example of a concentrator structure.

FIG. 4 shows an alternative embodiment of the solar concentrator. In this embodiment, the solar concentrator body is a bulb of moldable, lightweight and cheap material, such as glass or plastic. The bulb is blow molded with a transparent material to form a unitary body with a thin wall and a bulb neck 40 connecting the interior of the structure to atmosphere, which can be sealed to contain vacuum and gases with certain compositions. The structure may comprise a metallic reflective layer covering a certain geometric area of the body.

Figure 5:
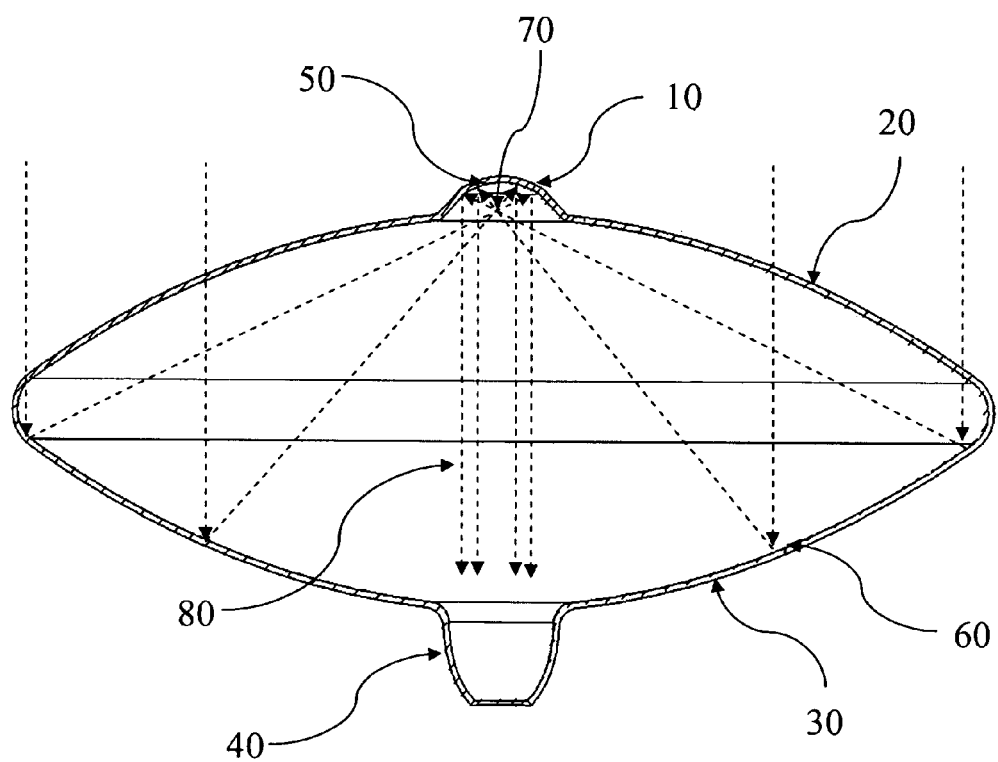
FIG. 5 is the cross section view of the bulb structure concentrator.

Referring to FIG. 5, the bottom parabola 30, top parabola 10, and CPC 40 are shaped as portions of the blow molded transparent chamber body wall; the transparent top cover 20 can be shaped into any shape. Then a reflective layer 50 is coated on the inner surface of parabola 10, and another reflective layer 60 is coated on the inner surface of parabola 30 and CPC 40. The parabolas 10 and 30 are configured in such a way that the focal point of parabola 10 is overlapped with the focal point of parabola 30 at point 70. The bottom reflector 30 plus 60 and the top reflector 10 plus 50 form an optics in which the incident light that penetrates the top transparent cover is reflected by the first reflector cross at the point 70 and hit on the second reflective surface, then it is reflected by the second reflector to form a collimated beam light.

The enclosed body of thin walled transparent material is substantially a bulb with a bulb neck as an opening to communicate with the external atmosphere of the closed body and which can be sealed to contain vacuum and gases with certain compositions. The bulb itself is a strong mechanical structure to support itself to collect and concentrate sunlight without any other supporting systems. The thin wall of the bulb body has to have a certain thickness and stiffness to have enough material strength to form the predetermined geometric shape and to retain it without any inflating system. The bulb neck 40 is made rigid so that it can be used as a connection for integration into systems. The bulb neck 40 is made of a CPC concentrator serving as auxiliary optics for receiver.

An upper half portion 20 of the thin wall of the enclosed body is transparent to allow light to enter the enclosed structure. A lower half portion 30 is formed into a concave parabola shape so that the sunlight incident on it can be reflected and concentrated to a predetermined point.

A dome with top area made inverse parabola 10 is shaped during blow molding process at the center of the upper transparent half portion 20 of the thin wall enclosed body. The inverse parabola 10 shares the same focal point of the lower half portion 30 of the enclosed body.

A CPC concentrator 40 is shaped at the center of the lower portion 30, which is a concave parabola, of the enclosed body during the blow molding process. The inner surface of the CPC is coated with metallic reflective layer.

FIG. 1 and FIG. 4 show the concentrator structure that has substantially mirror-image shaped upper and lower halves 20 and 30. The shape of transparent top portion 20 can vary in shape and be different from bottom portion 30. The upper portion may even have a flat shape. Other shape considerations may also be implemented when selecting of the upper half, such as selecting a cylindrical shape for upper half portion 20. In addition, a spherical shape for either or both of the upper and lower half may be advantageous. Changes in the shape of bottom portion 30 results in a change in focal point for the solar concentrator, so the shape of bottom portion 30 may be adjusted to provide a specific area of concentrated light incidence.

From the description above, a number of advantages of the solar concentrator become evident. The reflector structure can be an enclosed hollow core body structure that enables non-rigid, lightweight and cheap materials such as plastic and glass to be used. The materials may be selected to build a thin walled body structure that is a strong mechanical object which supports itself without any supporting or inflating systems. The enclosed body structure can be a strong mechanical structure that effectively prevents the distortion of the geometric surface of the concentrator when in the manufacture process and when in use. The enclosed body structure provides a natural protection to the reflective surface from dust and any other contamination and makes maintenance much easier. The addition of the second parabola reflector and the CPC concentrator effectively eliminate the support arms of receiver and incorporate the auxiliary optics of receiver into concentrator structure. In particular, the additional secondary concentrator and the CPC are just part areas of the enclosed body structure.

Accordingly, the hollow core solar concentrator with secondary concentrator and CPC concentrator provides an approach to realize an ultra-light, exclusively cheap, extremely compact solar concentrator and its highly simplified assembly structure with its receiver. This approach realizes the self-protection of the reflective surface from dust and other contaminations. This approach also makes a system based on the solar concentrator ultra-light and robust and where the solar concentrator can be driven to track the sun with less power and with a relatively simple control system.

The bulb structure of the concentrator makes it easy to form a cavity sealed to contain vacuum or gases with certain compositions, which fosters the harvesting of thermal energy from the sun and the mitigating of the issues caused by the water and oxygen in air such as the water vapor condensing on the transparent wall. Using transparent body wall of the chamber to form concentrators makes the concentrator compact and easy to manufacture.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A solar concentrator comprising:
a closed chamber defined by a rigid hemispherical parabolic top portion and a rigid hemispherical parabolic reflective bottom portion opposite the top portion, wherein the rigid hemispherical parabolic top portion and the rigid hemispherical parabolic reflective bottom portion are configured to maintain the shape of the closed chamber without the use of additional support elements;
wherein the top portion is transparent except for a hemispherical reflective concave inverse parabolic structure at a central area of the top portion that is concave with respect to the chamber, and wherein the reflective concave inverse parabolic structure is at a focal point of the bottom portion, and wherein a parabola defined by the reflective concave inverse parabolic structure is not coincident with a parabola defined by the top portion; and
wherein the bottom portion is coupled with a hemispherical compound parabolic concentrator (CPC) at a focal point of the reflective concave inverse parabolic structure, and wherein a parabola defined by the bottom portion is not coincident with a parabola defined by the CPC.

2. The solar concentrator of claim 1, wherein the closed chamber is a sealed chamber filled with an inert gas.

3. The solar concentrator of claim 1, wherein the closed chamber is a vacuum chamber.

4. The solar concentrator of claim 1, wherein the solar concentrator is configured such that light that enters the closed chamber through the transparent top portion is reflected by the parabolic reflective bottom portion to the reflective concave inverse parabolic structure; and
wherein the light is further reflected by the reflective concave inverse parabolic structure to the CPC.

5. The solar concentrator of claim 1, wherein the parabolic reflective bottom portion has a substrate having an inner surface in an inner portion of the closed chamber and an outer surface opposite the inner surface, and the reflective bottom portion further has a reflective material coupled with the inner surface.

6. The solar concentrator of claim 1, wherein the top portion has an inner surface in an inner portion of the closed chamber and an outer surface opposite the inner surface, and the reflective concave inverse parabolic structure includes a reflective material coupled with the inner surface.

7. The solar concentrator of claim 1, wherein the top portion and the bottom portion are configured to be concave with respect to the chamber, and opposite one another.

* * * * *